（12）United States Patent
Fritz (10) Patent No.: US 7,693,967 B2
(45) Date of Patent: Apr. 6, 2010

(54) METHOD AND APPARATUS FOR ASSISTING SYSTEM CONFIGURATION ACTIVITIES

(75) Inventor: Jason Fritz, Broomfield, CO (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1393 days.

(21) Appl. No.: 11/105,210

(22) Filed: Apr. 13, 2005

(65) Prior Publication Data

US 2006/0245268 A1 Nov. 2, 2006

(51) Int. Cl.
*G06F 15/177* (2006.01)
(52) U.S. Cl. ........................ 709/220; 709/206; 709/224; 709/228
(58) Field of Classification Search ................. 709/206, 709/228, 224, 220; 707/200
See application file for complete search history.

(56) References Cited

U.S. PATENT DOCUMENTS

| | | | |
|---|---|---|---|
| 6,178,502 | B1 | 1/2001 | Caswell et al. |
| 6,615,255 | B1 * | 9/2003 | Blaszczak .................... 709/220 |
| 6,742,124 | B1 | 5/2004 | Kilpatrick et al. |
| 6,854,052 | B2 * | 2/2005 | Beeston et al. ................ 713/1 |
| 2007/0156774 | A1 * | 7/2007 | Gomes ....................... 707/200 |

OTHER PUBLICATIONS

Gilleland, Michael, *The Levenshtein Distance, in Three Flavors*, http://www.merriampark.com/ld.htm, 12 pages.
Author Unkown, *Dynamic Programming Algorithm (DPA) for Edit-Distance*, http://www.csse.monash.edu.au/~lloyd/tildeAlgDS/Dynamic/Edit/, 5 pages.

* cited by examiner

*Primary Examiner*—Vivek Srivastava
*Assistant Examiner*—Adnan Mirza
(74) *Attorney, Agent, or Firm*—Coats & Bennett, P.L.L.C.

(57) ABSTRACT

A configuration assistance manager provides configuration assistance to an operator attempting to configure a configurable system by identifying one or more valid configurations that are nearest to matching a current invalid configuration. In at least one embodiment, the configurable system is configurable via the selective installation of system components, and the manager represents the detected combination of installed system components as a first code word that is compared to a set of second code words corresponding to valid (permitted) combinations of installed components. The comparison may comprise determining the mathematical distances between the first code word and one or more of the second code words. The closest matching valid configurations are identified as those having the smallest comparison distances, and the manager may thus provide detailed instructions for changing from the current invalid configuration to the closest matching configuration(s).

17 Claims, 7 Drawing Sheets

| RF SUBRACK 44 | DIGITAL SUBRACK 40 |
|---|---|
| sRx Card slot 1 | |
| mTx Card slot 2 | |
| sRx Card slot 3 | |
| | Channel Card slot 6 |
| sRx Card slot 7 | Channel Card slot 10 |
| mTx Card slot 8 | |
| sRx Card slot 9 | |
| sRx Card slot 13 | |
| mTx Card slot 14 | |
| sRx Card slot 15 | |

*FIG. 6*

| | |
|---|---|
| sRx Card slot 1 | |
| mTx Card slot 2 | |
| sRx Card slot 3 | |
| sRx Card slot 4 | Channel Card slot 6 |
| mTx Card slot 5 | |
| sRx Card slot 6 | |
| sRx Card slot 7 | Channel Card slot 10 |
| mTx Card slot 8 | |
| sRx Card slot 9 | |
| sRx Card slot 10 | |
| mTx Card slot 11 | Channel Card slot 16 |
| sRx Card slot 12 | Channel Card slot 18 |
| sRx Card slot 13 | |
| mTx Card slot 14 | |
| sRx Card slot 15 | |
| sRx Card slot 16 | |
| mTx Card slot 17 | |
| sRx Card slot 18 | |
| RF SUBRACK 44 | DIGITAL SUBRACK 40 |

*FIG. 7*

| | |
|---|---|
| sRx Card slot 1 | |
| mTx Card slot 2 | |
| sRx Card slot 3 | |
| | |
| | |
| | |
| sRx Card slot 7 | Channel Card slot 10 |
| mTx Card slot 8 | Channel Card slot 12 |
| sRx Card slot 9 | |
| | |
| | |
| | |
| sRx Card slot 13 | |
| mTx Card slot 14 | |
| | |
| | |
| | |
| | |

RF SUBRACK
44

DIGITAL SUBRACK
40

METHOD AND APPARATUS FOR ASSISTING SYSTEM CONFIGURATION ACTIVITIES

BACKGROUND

The present invention generally relates to configurable systems, such as wireless communication network nodes that use multiple circuit card configurations, and particularly relates to providing assistance for system configuration activities.

A seemingly obvious relationship exists between the number of configuration options available for a given system and the number of configuration mistakes that are routinely made by those responsible for configuring the system. For example, operators routinely make configuration mistakes when configuring the potentially complicated systems and devices that make up wireless communication networks, although such networks represent just one example of commonly encountered configuration complexities.

A "simple" radio base station nicely illustrates the oftentimes-daunting configuration tasks faced by the personnel responsible for setting up and maintaining communication networks. Maintainability, expandability, and serviceability represent paramount considerations for many types of communication equipment, and radio base stations are no exception. Thus, a common architectural approach involves the adoption of a rack/sub-rack model, wherein the capacity, capability, and specific operating configuration of the radio base station depends on the particular combination(s) of circuit cards installed in its racks and/or sub-racks.

The specific combination of card types and card locations within the rack/sub-rack structure of the radio base station determines its configuration, and a given radio base station may have dozens or even hundreds of allowed configurations. In this context, it is relatively easy to configure the radio base station incorrectly by installing the wrong card types, installing too many cards, installing the wrong combinations of cards, installing cards in the wrong locations, etc. Worse still, the conventional radio base station does nothing more helpful than provide an indication that its current configuration is invalid, leaving the operator to make guesses about why the configuration is invalid, and what needs to be done to correct the condition.

Of course, the above radio base station hypothetically represents just one example of a much broader range of circumstances in which configuration mistakes are commonplace and difficult to avoid. Many other types of nodes in wireless and other types of communication networks have similar configuration complexities. Further, many types of software and computer systems have potentially bewildering arrays of configuration options, requiring operators to make configuration decisions involving complex combinations hardware components, software components, etc.

SUMMARY OF THE DISCLOSURE

In one embodiment, a method of providing configuration assistance for a configurable system comprises comparing a current invalid configuration of the configurable system with defined valid configurations to identify one or more nearest valid configurations, and generating assistance information to assist reconfiguring the configurable system from the current invalid configuration to one of the one or more nearest valid configurations. As such, the method may comprise representing a current invalid configuration of the configurable system as an invalid configuration word, identifying one or more nearest valid configurations of the configurable system by comparing the invalid configuration word to a set of valid configuration words corresponding to valid configurations of the configurable system, and generating configuration assistance information based on the one or more nearest valid configurations.

By way of non-limiting example, the configurable system may comprise a node for use in a wireless communication network. In such embodiments, the node may be configurable via the selective installation of circuit cards of different types in designated locations. As such, the value of the invalid configuration word may correspond to a detected combination of installed circuit cards and the values of the valid configuration words may correspond to permitted combinations of installed circuit cards. Then, identifying the nearest valid configuration(s) may comprise identifying one or more closest matching valid configurations relative to the current invalid configuration by comparing values of the invalid and valid configuration words. By way of non-limiting example, the comparison may be based on determining the mathematical distance between the invalid and valid configuration words. The Levenshtein Distance Algorithm (LDA) is used as the distance algorithm in at least one embodiment of the configuration assistance methods taught herein.

More generally, the configurable system may be configurable via the selective installation of system components, wherein the term "system components" broadly connotes circuit cards, circuit components, subassemblies, etc., or even non-physical components, such as software functions, libraries, modules, libraries, etc. Thus, the value of the invalid configuration word may correspond to a detected combination of installed system components and values of the valid configuration words correspond to permitted combinations of installed system components, and wherein identifying one or more nearest valid configurations of the configurable system comprises determining a mathematical distance between the invalid configuration word and one or more of the valid configuration words.

By way of non-limiting example, the distance calculation may be based forming the invalid configuration word and valid configuration words as code words comprising individual code "letters." For the invalid configuration word, the letters represent code values corresponding to the detected combination of installed system components, e.g., circuit cards, and the letters in the valid configuration words correspond to the permitted combinations of installed system components. Thus, an LDA-based analysis may be used to identify the closest matching valid configurations in much the same manner as a word processing spell checker identifies the word (or words) most likely intended when a user enters a misspelled word. That is, the LDA may be used to measure the word/letter distances between the invalid configuration word and the valid configuration words, so that the closest matching valid configuration will have the smallest distance, the next closest matching valid configuration will have the next smallest distance, and so on.

In one embodiment, the configuration assistance method is embodied as a computer program stored in a computer readable medium. The computer program, which may be a downloadable applet for local or remote execution, comprises program instructions to identify the nearest matching valid configurations based on comparing an invalid configuration word (corresponding to the detected invalid configuration) with valid configuration words corresponding to permitted configurations. The program further provides configuration assistance, such as by identifying details regarding the current invalid configurations, and providing instructions for how to move from the current invalid configuration to the closest matching valid configuration, e.g., a list identifying the stepby-step process for converting to the closest matching valid configuration. Of course, the assistance information may provide instructions for moving to more than one valid configuration (e.g., the three most closely matching configurations), or may allow the operator to pick a desired configuration and then provide corresponding instructions.

Of course, the present invention is not limited by the foregoing summary of selected features and advantages. Those skilled in the art will recognize additional features and advantages upon reading the following description, and upon viewing the accompanying drawings.

DESCRIPTION OF EMBODIMENTS OF THE INVENTION

Figure 1:
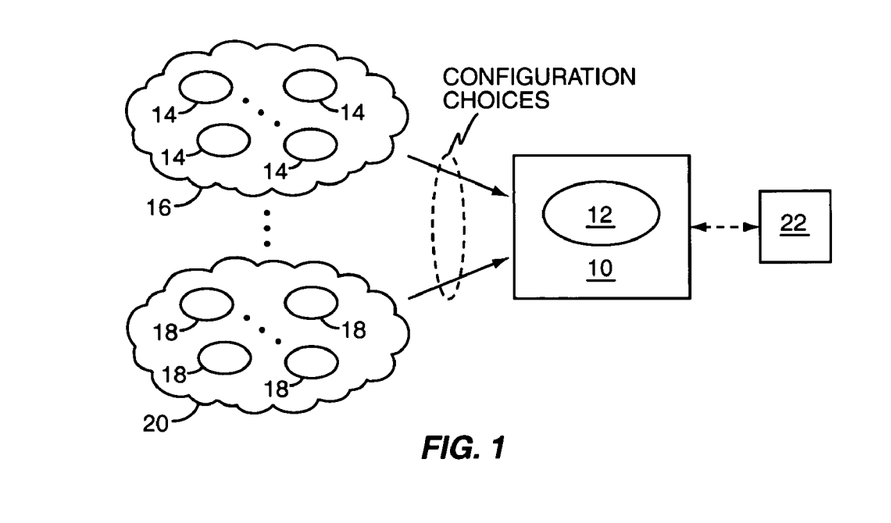
FIG. 1 is a block diagram of a configurable system, wherein the system's configuration is at least partly defined via the selective installation of system components.

FIG. 1 illustrates a configurable system 10, including a collection of system components 12. The particular number and type of system components included in the collection of system components 12 defines the "configuration" of the configurable system 10. For example, any number of individual system components 14 from a first system component group 16 may be included or installed in the configurable system 10, and any number of additional system components 18 may be installed from a second system component group 20. More generally, there may be any number of different system component types, such that the configuration of the configurable system 10 is defined by the particular combination of system components 12 installed into it. Thus, an operator must make one or more configuration choices regarding the numbers and types of system components 12 that are installed in the configurable system 10.

According to the configuration assistance methods taught herein, the configurable system 10 includes or is associated with a configuration assistance manager 22, which may be implemented in hardware, software, or any combination thereof. Broadly, the configuration assistance manager 22 compares the detected combination of system components 12 that are actually installed in the configurable system 10 to a database of permitted combinations of system components, corresponding to a set of valid configurations. If the actual configuration is invalid, the configuration assistance manager 22 identifies one or more closest matching valid configurations, and provides corresponding instructions to the operator, so that the current invalid configuration can be changed over to a valid configuration.

Figure 2:
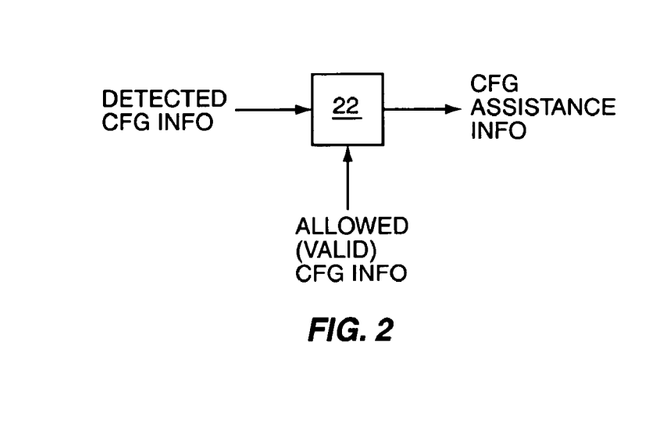
FIG. 2 is a block diagram of a configuration assistance manager that is included in, or associated with, the configurable system of FIG. 1.

FIG. 2 illustrates a functional embodiment of the configuration assistance manager 22, wherein the configuration assistance manager 22 generates configuration assistance information to aid an operator tasked with configuring the configurable system 10. More particularly, the configuration assistance information is generated based on a comparison between detected configuration information and allowed or valid configuration information. For example, an operator may have installed a given combination of system components 12 with the intent of achieving a particular configuration from among a plurality of valid configurations, but may have incorrectly installed one or more of the system components 12, or may have installed an improper mix of system components 12.

The configuration assistance manager 22 compares detected configuration information representing the current (invalid) configuration of the configurable system 10 and compares that with a database or table of valid configurations. From this comparison, the configuration assistance manager 22 provides the operator with specific instructions for changing from the current invalid configuration to one of the valid configurations. In at least one embodiment, the configuration assistance information identifies one or more of the valid configurations that are "nearest" to the currently detected invalid configuration. As such, the configuration assistance manager 22 provides the operator with instructions representing the changes needed to reconfigure the configurable system 10 from its current invalid configuration into a valid configuration that represents the most likely configuration that was intended by the operator.

Figure 3:
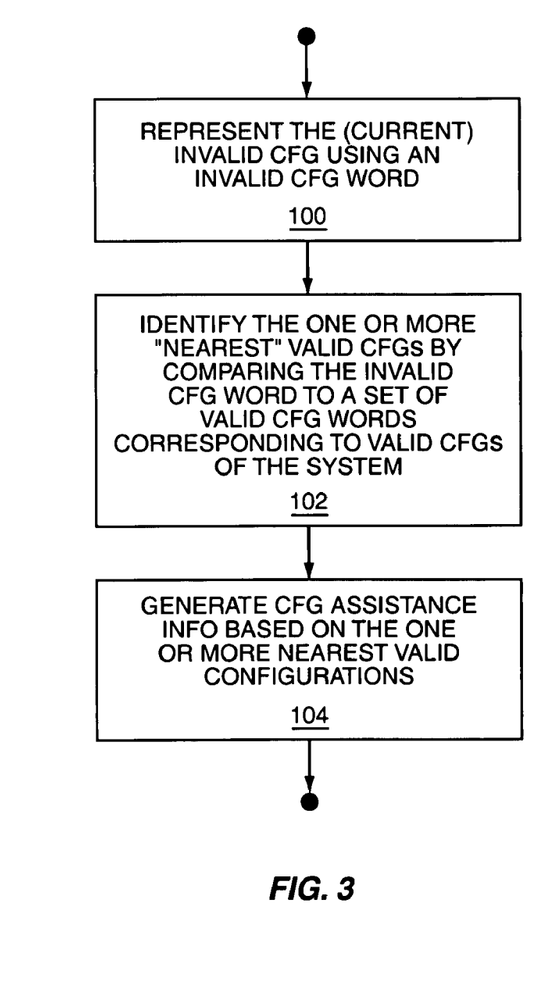
FIG. 3 is a logic flow diagram of a configuration assistance method according to one embodiment of the configuration assistance manager.

FIG. 3 illustrates program flow logic that may be implemented in an embodiment of the configuration assistance manager 22, wherein processing begins by representing the current invalid configuration by using an invalid configuration word (Step 100). Processing continues based on identifying the one or more nearest valid configurations, which may be done by comparing the invalid configuration word to a set of valid configuration words corresponding to valid configurations of the configurable system 10 (Step 102). The configuration assistance manager 22 then generates configuration assistance information based on the one or more valid configurations (Step 104). For example, the manager may provide step-by-step instructions for reconfiguring the system 10 from its current invalid configuration to at least one of the one or more nearest valid configurations.

With the above embodiment of configuration assistance management processing, identifying the one or more nearest valid configurations of the system 10 may comprise determining a mathematical distance between the invalid configuration word and one or more of the valid configuration words. The invalid and valid configuration words may be formed as code words, having "letter" values defined by the combinations of system components they represent. The code distance between the invalid configuration word and a given valid configuration word thus indicates how close the current invalid configuration is to the valid configuration corresponding to the valid configuration word being compared.

More particularly, in support of distance-based comparisons, the invalid configuration word may be formed as a first code word comprising code letters based on a detected combination of installed system components 12. Similarly, the valid configuration words may comprise second code words, with each second code word corresponding to a permitted combination of installed system components 12. By forming the invalid and valid configuration words as code words comprising letter values corresponding to particular combinations of system components (as actually detected or as permitted), the identification of the one or more nearest valid configurations may be performed by calculating a code distance between the first code word in one or more of the second code words. By way of non-limiting example, the distance determination may be made by comparing the invalid and valid configuration words according to the Levenshtein distance algorithm.

Indeed, in at least one embodiment, the configuration assistance manager 22 forms the first code word based on the detected configuration of actually installed system components 12 (whether invalid or not), and compares that first code word to the set of second code words. A zero-distance match between the first code word and one of the second code words indicates that the detected configuration of installed system components 12 matches one of the permitted configurations of installed system components 12.

However, if comparing the first code word to each of the second code words produces no exact match, the configuration assistance manager 22 can rank the results of such comparisons according to the non-zero comparison distance values to identify the permitted configurations of installed system components 12 that correspond to the smallest comparison distances. The configuration assistance manager 22 may be configured to provide assistance information only for the nearest matching valid configuration, or may provide assistance information for the top two or three nearest matching configurations, for example. Regardless, the configuration assistance manager 22 is adapted to generate configuration assistance information to assist reconfiguring the system 10 from its current invalid configuration to one or more of the nearest (closest matching) valid configurations.

It should be understood that the configuration assistance manager 22 can be implemented as software and thus may comprise a computer program stored in a computer readable medium. In at least one embodiment, the computer program comprises program instructions to represent a current invalid configuration of the configurable system 10 as an invalid configuration word, program instructions to identify one or more nearest valid configurations of the configurable system 10 by comparing the invalid configuration word to a set of valid configuration words corresponding to valid configurations of the configurable system 10, and program instructions to generate configuration assistance information based on the one or more nearest valid configurations. These program instructions may be configured or adapted in accordance with any or all of the above method variations in terms of forming and comparing the first and second code words.

It should be further understood that the system components 12 may comprise hardware components, software components, or any mix thereof. For example, the configurable system 10 may comprise a node for use in wireless communication network. In such embodiments, the configurable system 10 may be configurable via the selective installation of hardware and/or software components. For example, the configurable system 10 may be configurable via the selective installation of circuit cards of different types in designated locations, i.e., the installable system components 12 are embodied as removable circuit cards for installation in racks/sub-racks of the configurable system 10. In such embodiments, the value of the invalid configuration word corresponds to the currently detected combination of installed circuit cards and the values of the valid configuration words correspond to permitted combinations of installed circuit cards.

Thus, comparing the invalid configuration word to the set of valid configuration words comprises identifying the one or more closest matching valid configurations relative to the current invalid configuration based on comparing values of the invalid and valid configuration words. Effectively, this is equivalent to comparing a pattern of the detected combination of circuit cards actually installed with patterns of the permitted combinations of circuit cards.

Figure 4:
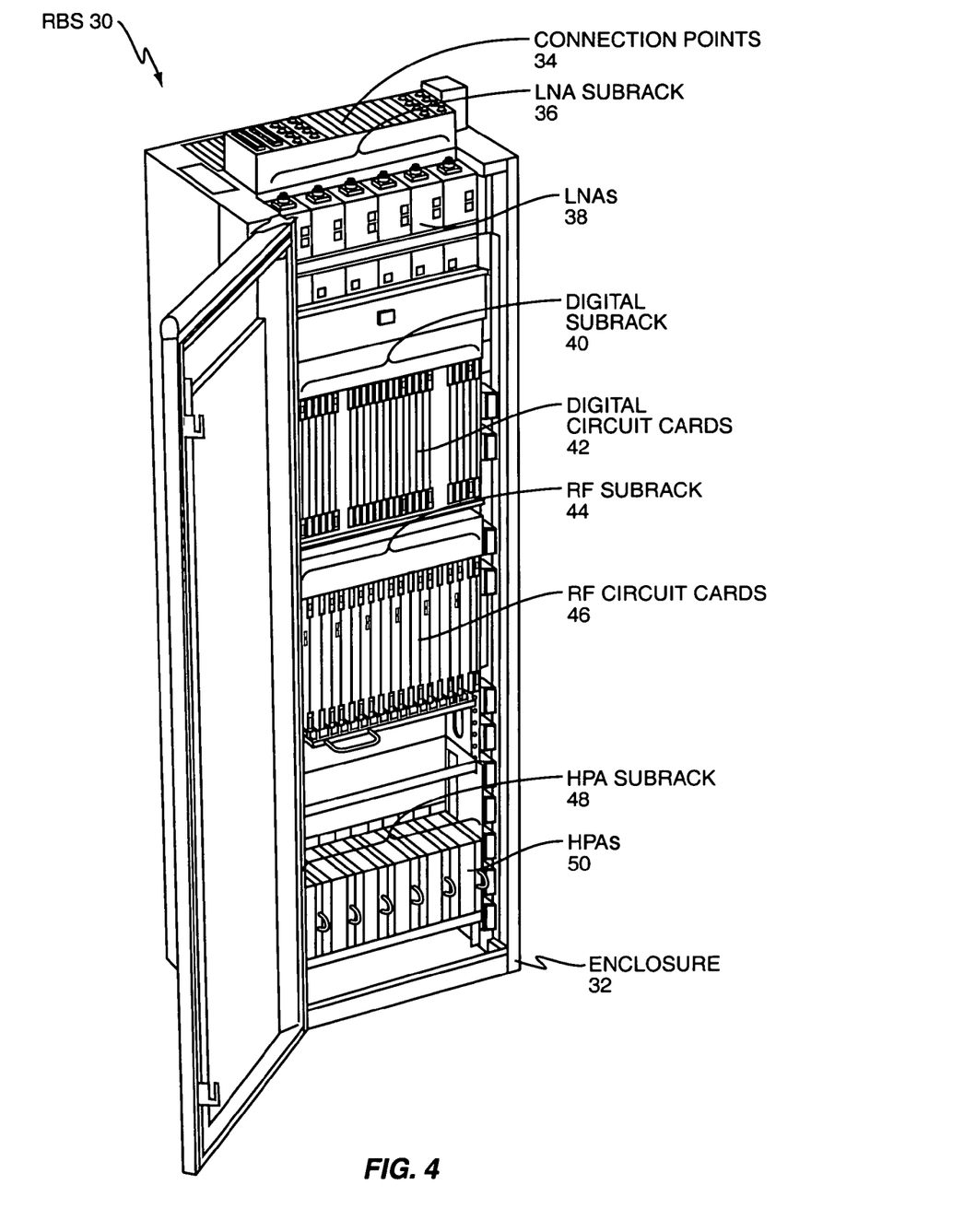
FIG. 4 is a pictorial diagram of a radio base station, which represents one type of configurable system.

FIG. 4 shows an embodiment of the configurable system 10 implemented as a wireless communication network node 30 that is specifically configured as a Radio Base Station (RBS). The node 30 comprises an enclosure 32 for enclosing its assemblage of circuit cards, fans, power supplies, etc. and a number of connection points 34 for interconnecting the node 30 with other entities within the wireless communication network.

Of more interest, the node 30 is implemented using a rack/sub-rack architecture that supports the selective installation of different types of circuit cards in different locations within the node 30. The particular number and types of circuit cards installed in the node 30 defines its configuration, and the typical RBS presents a potentially confusing range of valid card installation configurations.

In more detail, the illustrated node 30 comprises a Low Noise Amplifier (LNA) sub-rack 36 adapted to hold a configurable number of LNAs 38, a digital sub-rack 40 adapted to hold a configurable number of digital circuit cards 42, a radio frequency (RF) sub-rack 44 adapted to hold a configurable number of RF circuit cards 46, and a High Power Amplifier (HPA) sub-rack 48 adapted to hold a configurable number of HPAs 50.

Providing further points of configurability, there may be multiple types of digital circuit cards 42 that are installable in the digital sub-rack 40 according to a set of permitted combinations. Likewise, there may be different types of RF circuit cards 46 that are installable in different permitted combinations within the RF sub-rack 44. Together, the permitted combinations of digital circuit cards 42 in the digital sub-rack 40 and the permitted combinations of RF circuit cards 46 and the RF sub-rack 44 represent a larger combinational set of permitted configurations. Of course, the number and location of the LNAs 38 and HPAs 50 that are installed within the enclosure 32 also may vary as a function of which cards are installed in which racks. The overall number of permitted combinations of selectively installed components may number the dozens, or even hundreds. An operator attempting to configure the node 30 according to a particular set of operating requirements is therefore faced with a potentially formidable configuration challenge.

Figure 5:
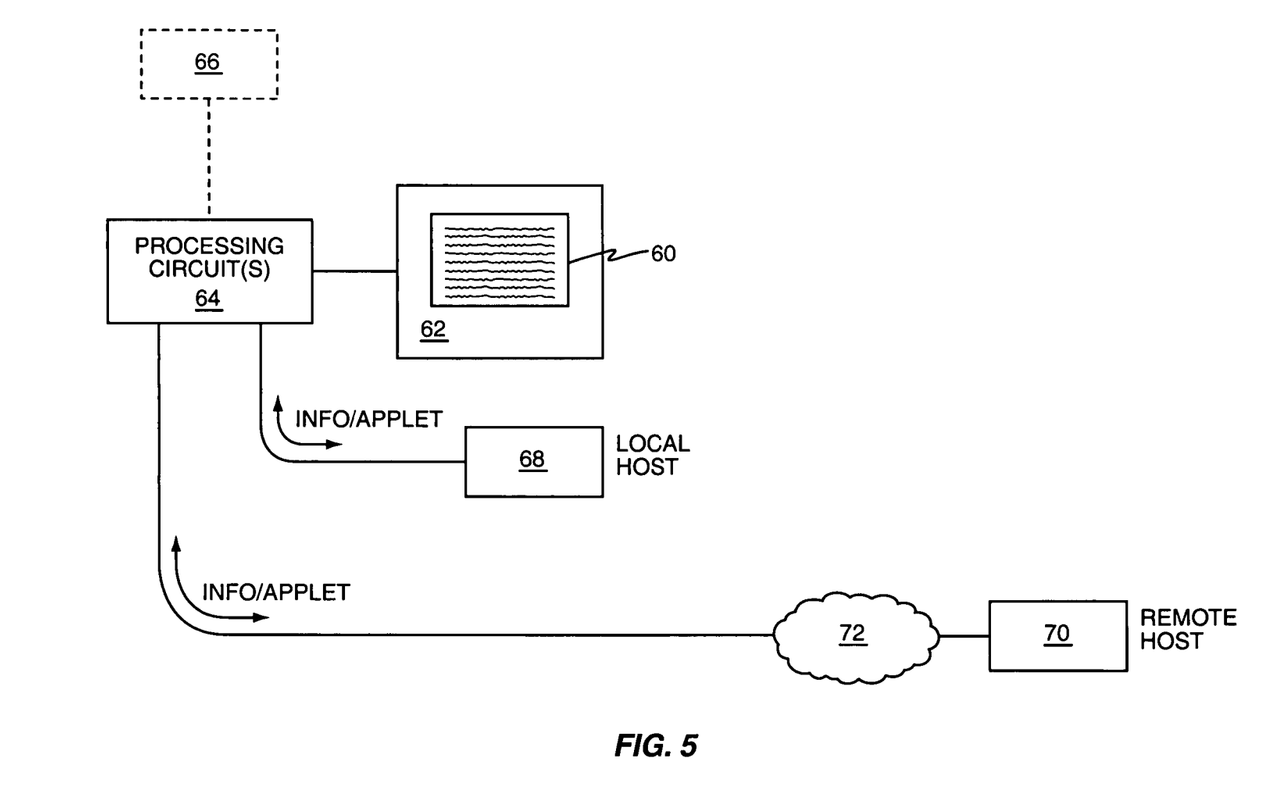
FIG. 5 is a block diagram of one embodiment of the radio base station for supporting local and/or remote configuration assistance.

To aid the operator in meeting that challenge, the node 30 includes an embodiment of the aforementioned configuration assistance manager 22. In one embodiment of the node 30, the configuration assistance manager 22 comprises a computer program 60 stored in a computer readable medium 62 (e.g., a memory or disk), which is readable by one or more processing circuits 64 that may be included on one or more of the digital circuit cards 42. The processing circuits 64 may execute the computer program 60 and therefore provide configuration assistance information to the operator for output via a local user interface 66 (e.g., a local displaced screen). The generated configuration assistance information also may be transferred for display on a local host 68 (e.g., a laptop computer communicatively coupled to the node 30) or may be transferred to a remote host 70 through a network 72.

Further, all or a portion of the computer program 60 may be transferred to the local host 68, or to the remote host 70, for execution. For example, at least a portion of the computer program 60 may comprise a downloadable application (applet) that may be transferred to a memory of local host 68 for execution by the local host 68, or transferred to a memory of the remote host 70 for execution by the remote host 70. Thus, in at least one embodiment, the configuration assistance manager 22 is implemented as a computer program 60 (or a collection of programs), wherein at least a portion of the program instructions comprise a downloadable applet, such as a JAVA applet.

Regardless of whether the computer program 60 is implemented as a downloadable applet or is configured for execution by the node 30, it may be adapted to identify the one or more nearest valid configurations of the node 30 relative to a currently detected invalid configuration based on the aforementioned distance evaluations. That is, placement of the proper types of circuit cards in the proper racks/slots of the RBS 30 defines the configuration of the RBS 30, and the computer program 60 may be adapted to identify differences between a detected combination of installed circuits cards and the valid combinations of installed circuit cards. The valid combinations may be stored in a table or database, such as in an Extensible Markup Language (XML) file retained in a memory of the RBS 30.

In one embodiment, the detected combination of installed circuit cards is represented as an invalid configuration word that is formed as a code word whose letters depend the individual cards actually installed in the RBS 30. Thus, the cards and their positions, e.g., rack card slots, are treated like letters in a word. As a simplified example of how this method works, one may assume that the RBS 30 has two valid configurations, corresponding to different Frequency Assignments (FAs) and sector arrangements. The two valid configurations for this example are a "2×3" configuration and a "4×3" configuration. In the 2×3 configuration, the RBS 30 has two FAs in each of three radio sectors, and in the 4×3 configuration, the RBS has four FAs in each of three radio sectors.

Figure 6:
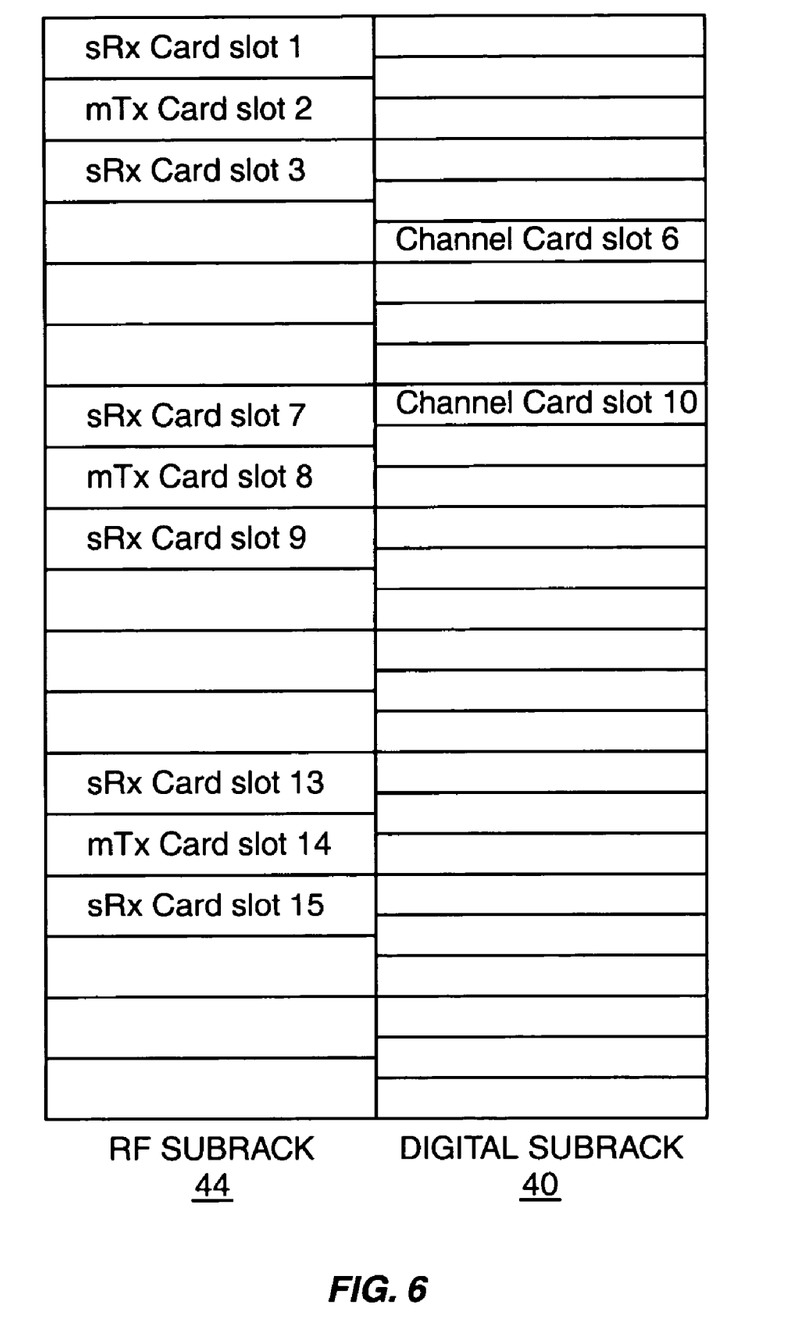
FIGS. 6 and 7 are tables illustrating valid combinations of installed radio base station circuit cards.

FIG. 6 illustrates the defined combination of circuit cards, according to type and location, corresponding to a valid 2×3 configuration. Channel Cards (CCs), which are a type of the earlier illustrated digital circuit cards 42, are installed in slots 6 and 10 of the digital sub-rack 40, and a mix of Receiver (Rx) and Transmitter (Tx) cards, which are types of RF circuit cards 46, are installed in various slots of the RF sub-rack 44. More particularly, Rx cards are installed in slots 1, 3, 7, 9, 13, and 15, and Tx cards are installed in slots 2, 8, and 14.

Note that the "s" and "m" prefixes used in the illustration indicate whether the given RF card 46 is a single or multiple receiver (or transmitter) card. Those skilled in the art will appreciate that the specific card details and, indeed, the larger RBS details, generally are implementation dependent, and will vary from manufacturer to manufacturer.

In any case, for the 2×3 configuration illustrated in FIG. 6, the valid configuration word representing the correct combination of installed circuit cards may be formed as: [[CC D6], [CC D10], [sRx R1], [mTx R2], [sRx R3], [sRx R7], [mTx R8], [sRx R9], [sRx R13], [mTx R14], [sRx R15]]. Here, the outermost brackets define the word boundaries, and each bracketed element within the word boundaries represents an installed card, whose letter value is a function of card type and its installation location. For example, the first letter of the valid 2×3 configuration word is [CC D6], where CC=Channel Card, D=digital sub-rack 40, and 6=Slot 6 of the digital sub-rack 40. As another example, the fourth letter of the valid 2×3 configuration word is [mTx R2], where mTx=a multiple transmitter card, R=RF sub-rack 44, and 2=Slot 2 of the RF sub-rack 44.

Figure 7:
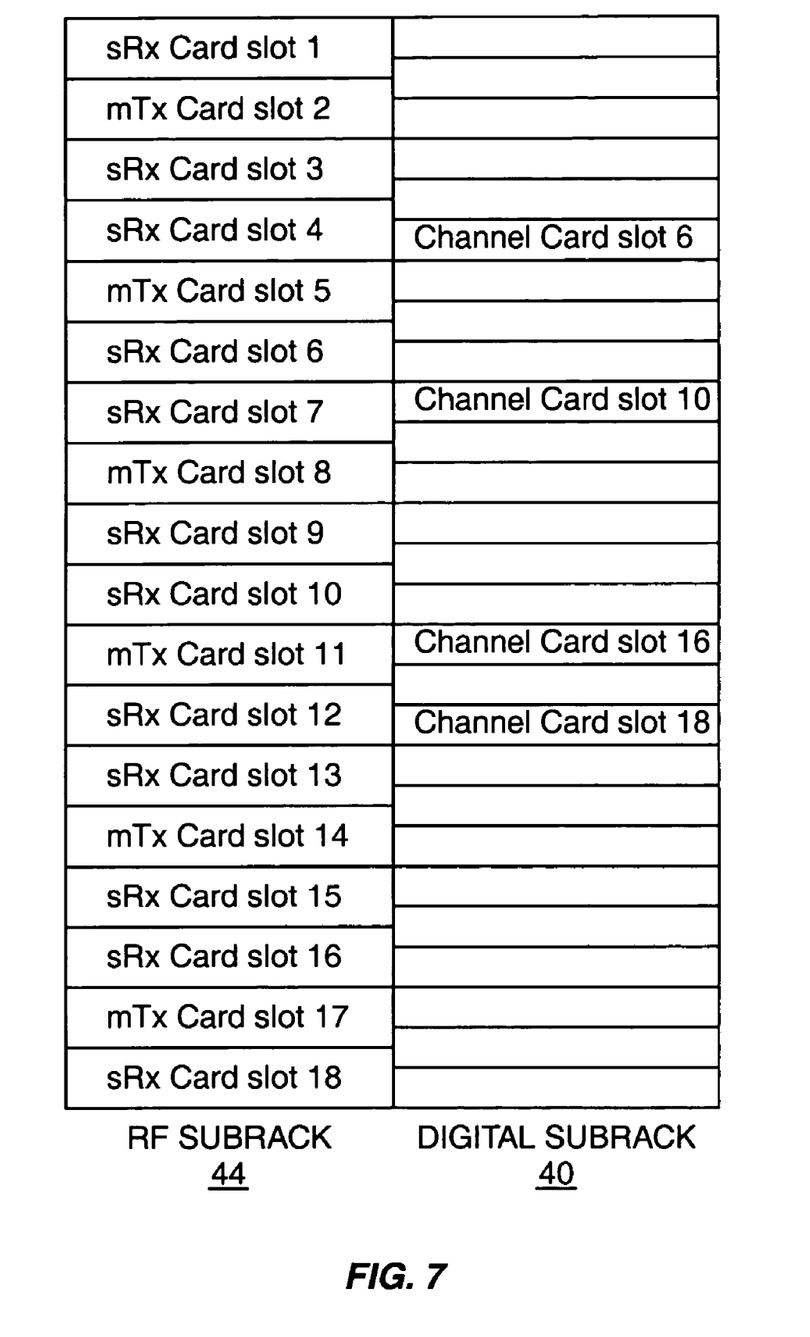

FIG. 7 similarly illustrates the combination of installed cards corresponding to the 4×3 configuration. The 4×3 configuration word is thus given as [[CC D6], [CC D10], [CC D16], [CC D18], [sRx R1], [mTx R2], [sRx R3], [sRx R4], [mTx R5], [sRx R6], [sRx R7], [mTx R8], [sRx R9], [sRx R10], [mTx R11], [sRx R12], [sRx R13], [mTx R14], [sRx R15], [sRx R16], [mTx R17], [sRx R18]].

The valid configurations words corresponding to the 2×3 and 4×3 configurations can be stored for comparison to the actual configuration of the RBS 30, as implemented by the operator. For this example, one may assume that an operator tried to place the RBS 30 in its 2×3 configuration, but instead placed the RBS 30 into the invalid configuration illustrated by FIG. 8. The invalid configuration illustrated in FIG. 8 does not match either of the valid configurations, i.e., the combination of installed cards does not match the combination of installed cards needed for the 2×3 configuration, and does not match the combination of installed cards needed for the 4×3 configuration.

Figure 8:
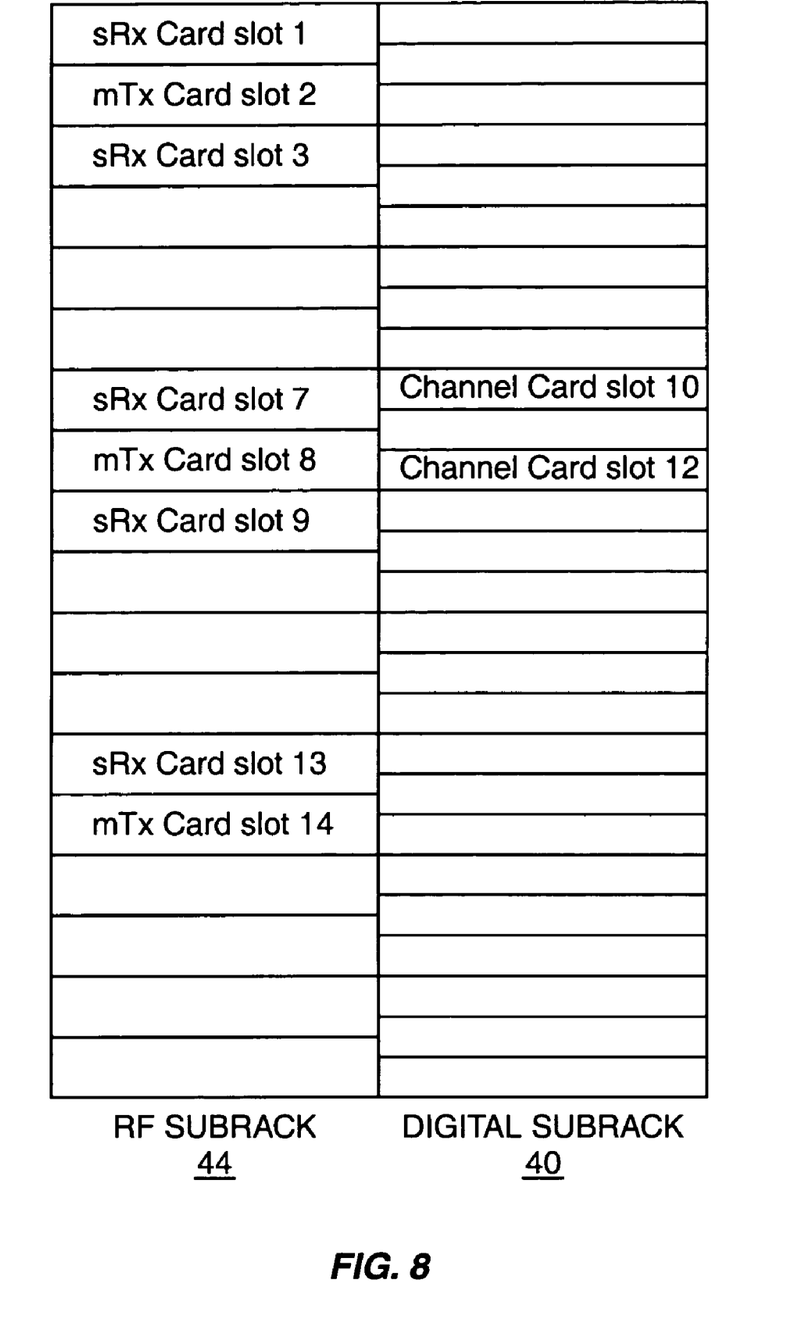
FIG. 8 is a table illustrating an invalid combination of installed radio base station circuit cards.

The invalid combination of currently installed cards can be represented as an invalid configuration word that is formed as [[CC D10], [CC D12], [sRx R1], [mTx R2], [sRx R3], [sRx R7], [mTx R8], [sRx R9], [sRx R13], [mTx R14]]. The invalid configuration word effectively is a word with ten letters, and the configuration assistance manager 22 can be configured to use a distance algorithm to identify the mathematical distance between the invalid configuration word and each of one or more of the valid configuration words.

In one embodiment, the comparison method uses the Levenshtein distance algorithm to determine the distances. The Levenshtein distance algorithm is used in spell checkers to determine the number of edits (i.e., additions, deletions, and substitutions) required to change one word into another. For example, the edit distance of "a" to "ab" is 1 because one simply adds the letter "b" (one edit). The distance from "a" to "a" is 0, from "a" to "b" is 1 and from "a" to "bb" is 2 (one substitution, one addition).

In this framework then, the configuration assistance manager 22 compares the edit distances between the invalid configuration word and the valid configuration words as follows:

Edit distance $d_1$ from current invalid configuration word to valid configuration word for 2×3 configuration=3 (i.e., remove CC D12, add CC D6, add sRx R15).

Edit distance $d_2$ from current invalid configuration word to valid configuration word for 4×3 configuration=13 (i.e., remove CC D12, add CC D6, CC D16, CC D18, and add many sRx/mTx cards).

Thus, the configuration assistance manager 22 determines whether the current invalid configuration word is nearer to the valid 2×3 configuration word, or nearer to the valid 4×3 configuration word, based on comparing the edit distances. In the above example, $d_1$ is less than $d_2$, so the configuration assistance manager determines that the valid 2×3 configuration is closest to the current invalid configuration, and generates configuration assistance information accordingly.

Figure 9:
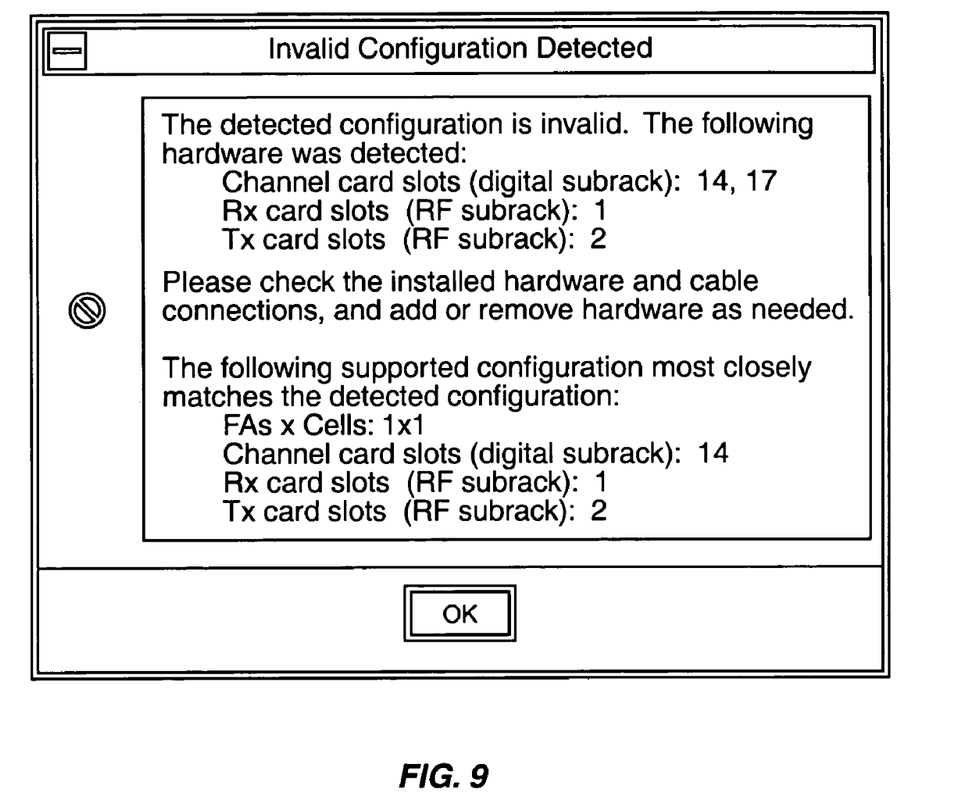
FIG. 9 is a diagram of a configuration assistance dialog box, such as might be presented to an operator needing configuration assistance.

Such information may be displayed to the operator (locally or remotely) as shown in FIG. 9. In FIG. 9, one sees that at least one embodiment of the configuration assistance manager 22 provides the operator with configuration assistance information indicating that the current configuration is invalid, identifying the particulars of the current configuration, identifying the closest matching valid configuration, and providing step-by-step instructions for changing from the current invalid configuration to the closest matching valid configuration.

Of course, the RBS 30 actually may have many valid configurations. As such, the configuration assistance manager 22 may identify the nearest matching valid configuration, and some number of next-nearest matching configurations, e.g., the three closest configurations, and thus may generate configuration assistance for more than one nearest valid configuration. This allows the operator to review the closest matching valid configurations, and identify the particular one he or she intended.

Further, it may be that some cards (or card locations) are more important than others in terms of defining the RBS's configuration. For example, a given valid combination of digital circuit cards 42 in the digital sub-rack 44 may support several different arrangements of RF circuit cards 46 in the RF sub-rack 44. As such, it may be more useful to generate configuration assistance information using only a subset of the installed cards, or using a weighted combination of cards, where the digital sub-rack 40 is weighted more heavily in the distance calculations used to identify the nearest matching valid configurations.

More generally, in the context of generic system components 12 to be installed in the earlier illustrated configurable system 10, it should be understood that certain system components 12 may be more important than others within the configuration hierarchy, and it should be understood that the configuration assistance manager 22 can be configured to work with selected (and excluded) system component subsets and/or with weighted combinations of system component subsets, when comparing invalid and valid configurations.

Thus, the configuration assistance methods described above are properly understood as examples of a broad method of providing configuration assistance for the configurable system 10. In at least one embodiment, that method comprises representing a current invalid configuration of the configurable system as an invalid configuration word.

Effectively, the invalid configuration word is represented as a code word, whose letter values correspond to the particular combination of system components 12 actually installed in the configurable system 10. One or more nearest-matching valid configurations are identified by comparing the invalid configuration word with a set of valid configuration words, which are represented as code words whose letter values correspond to permitted combinations of installed system components 12.

The code distance(s) between the invalid and valid configuration words are evaluated to identify the valid configuration(s) that are closest to matching the invalid configuration, and configuration assistance information is then generated accordingly. In this context, the code distance may be viewed as an edit distance that identifies the number of changes needed to move from the invalid configuration to a valid configuration. More generally, the distance is a mathematical distance that can be represented according to any number of mathematical algorithms.

Thus, those skilled in the art should appreciate that the present invention is not limited by the foregoing discussion or by the accompanying drawings. Indeed, the present invention is limited only by the following claims and their legal equivalents.

What is claimed is:

1. A method of providing configuration assistance for a configurable system, the method comprising:
    representing a current invalid configuration of the configurable system as an invalid configuration word;
    identifying one or more nearest valid configurations of the configurable system by comparing the invalid configuration word to a set of valid configuration words corresponding to valid configurations of the configurable system; and
    generating configuration assistance information based on the one or more nearest valid configurations;
    wherein a value of the invalid configuration word corresponds to a detected combination of installed system components and values of the valid configuration words correspond to permitted combinations of installed system components, and wherein identifying one or more nearest valid configurations of the configurable system comprises determining a mathematical distance between the invalid configuration word and one or more of the valid configuration words; and
    wherein the configurable system comprises a node for use in a wireless communication network, and wherein the node is configurable via the selective installation of circuit cards of different types in designated locations, and wherein a value of the invalid configuration word corresponds to a detected combination of installed circuit cards and the valid configuration words correspond to permitted combinations of installed circuit cards.

2. The method of claim 1, wherein determining a mathematical distance between the invalid configuration word and one or more of the valid configuration words comprises comparing the invalid configuration word to the one or more valid configuration words according to the Levenshtein Distance Algorithm (LDA).

3. The method of claim 1, wherein representing a current invalid configuration of the configurable system as an invalid configuration word comprises forming a first code word comprising code letters based on a detected combination of installed system components.

4. The method of claim 3, wherein the valid configuration words comprise second code words, each corresponding to a permitted combination of installed system components, and wherein identifying one or more nearest valid configurations of the configurable system by comparing the invalid configuration word to a set of valid configuration words corresponding to valid configurations of the configurable system comprises identifying the one or more nearest valid configurations by calculating a code distance between the first code word and one or more of the second code words.

5. The method of claim 1, wherein identifying one or more nearest valid configurations of the configurable system by comparing the invalid configuration word to a set of valid configuration words corresponding to valid configurations of the configurable system comprises identifying one or more closest matching valid configurations relative to the current invalid configuration based on comparing values of the invalid and valid configuration words.

6. The method of claim 1, wherein the designated locations comprise slots in two or more functional types of card racks in the node, and further comprising basing the identification of the one or more closest matching valid configurations on a subset of the two or more functional types of card racks, or on a weighted combination of the two or more functional types of card racks.

7. The method of claim 1, wherein generating configuration assistance information based on the one or more nearest valid configurations comprises generating information to assist reconfiguring the configurable system from the current invalid configuration to one or more of the nearest valid configurations.

8. The method of claim 1, wherein generating configuration assistance information based on the one or more nearest valid configurations comprises generating information identifying the current invalid configuration, identifying at least one of the one or more nearest valid configurations, and identifying steps to be taken for changing the configurable system from the current invalid configuration to the at least one of the one or more nearest valid configurations.

9. A computer readable medium storing a computer program adapted to provide configuration assistance for a configurable system, the computer program comprising:

program instructions to represent a current invalid configuration of the configurable system as an invalid configuration word;

program instructions to identify one or more nearest valid configurations of the configurable system by comparing the invalid configuration word to a set of valid configuration words corresponding to valid configurations of the configurable system; and program instructions to generate configuration assistance information based on the one or more nearest valid configurations;

wherein a value of the invalid configuration word corresponds to a detected combination of installed system components and values of the valid configuration words correspond to permitted combinations of installed system components, and wherein the program instructions to identify one or more nearest valid configurations of the configurable system comprise program instructions to determine a mathematical distance between the invalid configuration word and one or more of the valid configuration words; and wherein the configurable system comprises a node for use in a wireless communication network, and wherein the node is configurable via the selective installation of circuit cards of different types in designated locations, and wherein a value of the invalid configuration word corresponds to a detected combination of installed circuit cards and the valid configuration words correspond to permitted combinations of installed circuit cards.

10. The computer readable medium of claim 9, wherein the computer program comprises a downloadable applet adapted for at least partial execution by a computer system communicatively coupled to the configurable system.

11. The computer readable medium of claim 9, wherein the computer program comprises a native application adapted for execution by the configurable system.

12. The computer readable medium of claim 9, wherein the program instructions to determine a mathematical distance between the invalid configuration word and one or more of the valid configuration words comprise program instructions to compare the invalid configuration word to the one or more valid configuration words according to the Levenshtein Distance Algorithm (LDA).

13. The computer readable medium of claim 9, wherein the program instructions to represent a current invalid configuration of the configurable system as an invalid configuration word comprise program instructions to form a first code word comprising code letters based on a detected combination of installed system components.

14. The computer readable medium of claim 13, wherein the valid configuration words comprise second code words, each corresponding to a permitted combination of installed system components, and wherein the program instructions to identify one or more nearest valid configurations of the configurable system by comparing the invalid configuration word to a set of valid configuration words corresponding to valid configurations of the configurable system comprise program instructions to identify the one or more nearest valid configurations by calculating a code distance between the first code word and one or more of the second code words.

15. The computer readable medium of claim 9, wherein the program instructions to identify one or more nearest valid configurations of the configurable system by comparing the invalid configuration word to a set of valid configuration words corresponding to valid configurations of the configurable system comprise program instructions to identify one or more closest matching valid configurations relative to the current invalid configuration based on comparing values of the invalid and valid configuration words.

16. The computer readable medium of claim 9, wherein the designated locations comprise slots in two or more functional types of card racks in the node, and wherein the program instructions to identify one or more nearest valid configurations of the configurable system comprise program instructions to base the identification of the one or more closest matching valid configurations on a subset of the two or more functional types of card racks, or on a weighted combination of the two or more functional types of card racks.

17. The computer readable medium of claim 9, wherein the program instructions to generate configuration assistance information based on the one or more nearest valid configurations comprise program instructions to generate information to assist reconfiguring the configurable system from the current invalid configuration to one or more of the nearest valid configurations.

\* \* \* \* \*